Aug. 6, 1968　　　　D. W. CUFF　　　　3,395,994
METHOD OF MAKING FINE ADJUSTMENT IN NUMERICAL APERTURE OF
FIBER OPTICAL DEVICES
Filed Oct. 12, 1964

INVENTOR.
DAVID W. CUFF
BY
ATTORNEY

United States Patent Office 3,395,994
Patented Aug. 6, 1968

3,395,994
METHOD OF MAKING FINE ADJUSTMENT IN NUMERICAL APERTURE OF FIBER OPTICAL DEVICES
David W. Cuff, Webster, Mass., assignor, by mesne assignments, to American Optical Company, Southbridge, Mass., a corporation of Delaware
Filed Oct. 12, 1964, Ser. No. 403,000
7 Claims. (Cl. 65—17)

ABSTRACT OF THE DISCLOSURE

A method of making adjustment in numerical aperture of an assembled fiber optical light-conducting device having one or more core parts of glass of one index of refraction each clad with a glass of a different index of refraction. The technique consists essentially of selectively altering the refractive index of one of the constituent glasses relative to that of the other by compacting or densifying it under appropriate time-temperature conditions. Compaction is performed in an elevated controlled temperature environment where the rate of index change is most pronounced for the one glass.

---

Figure 1:
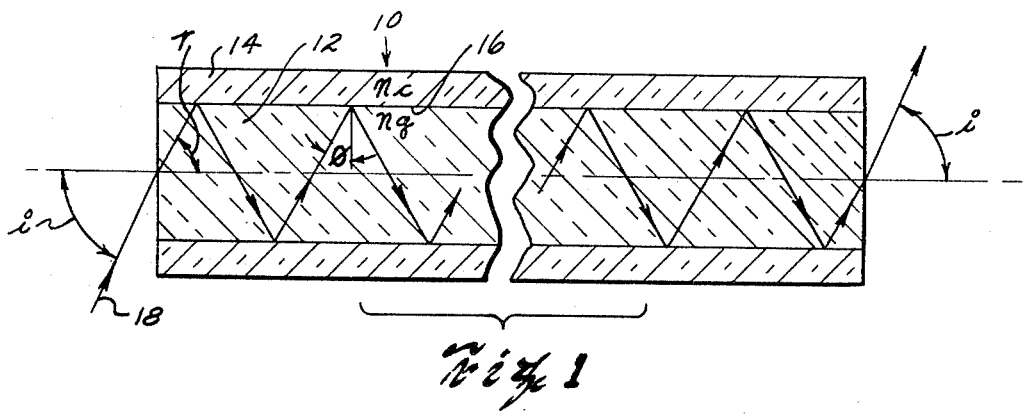

This invention relates to fiber optical devices formed of a multiplicity of glass optical fibers connected together in side-by-side relationship as a unit and has particular reference to a method of making fine adjustment in numerical aperture of such devices.

When light enters one end of a glass fiber much of it is caught inside the fiber unable to escape through the sides because of total internal reflection. This light is then internally reflected a number of times from the fiber walls and finally emitted at the far end of the fiber.

If glass fibers are bundled together so as to be within about a half wavelength of each other, light will leak from one fiber to another and transmittance by total internal reflection is seriously diminished. Accordingly, in forming fiber optical devices where tight bundles of fibers are used, it has been the practice to insulate the fibers from one another by the provision of a thin jacket or cladding of glass on each fiber which is of a lower refractive index than the fiber core.

The light-gathering ability of glass clad glass fibers or bundles thereof is determined by the degree of refractive index difference between constituent core and cladding glasses. Greater index differences provide the individual fibers with larger numerical apertures or light acceptance angles. Actually, however, only a slight index difference (i.e., less than 2.5%) between a fiber core and its jacket is required to provide the fiber with a very substantial numerical aperture and only minor changes in index difference produce relatively substantial changes in the light-gathering ability or numerical aperture of a fiber or bundle thereof.

Heretofore, when it was desired to achieve a very small numerical aperture or a carefully controlled light acceptance angle of any degree, physical index measurements of core and cladding materials were taken prior to fabrication of the product and calculated or predicted results based upon such measurements were relied upon for control of core and cladding index differences in the final product. Because optical glasses, when heated and drawn or otherwise worked, have greater deviation of refractive index properties than desired and the measured values are often substantially altered during fabrication of a composite fiber optical system, it has not been possible heretofore to achieve a refractive index difference always to the degree of precision required for accurate control of numerical aperture.

An object of the present invention is to provide for accurate control of numerical aperture in fiber optical devices and to attain the aforesaid object and others which may appear from the following detailed description, in accordance with principles of the invention, fine adjustment in refractive index correspondence between core and cladding glasses of a fiber optical assembly is achieved after fabrication and final processing stages of the assembly have been completed.

Essentially, the technique consists of selectively altering the refractive index of one of the constituent glasses to a greater degree than the other by compacting or densifying its molecular structure under controlled time-temperature conditions. The compaction or densification is performed in an elevated controlled temperature environment at an optimum level where index change is most pronounced for the particular glass whose refractive index must be differentially changed. Compaction of a glass increases its refractive index and adjustment of refractive index differences between core and cladding glasses of a fiber optical assembly is achieved by subjecting the assembly to heat of a temperature controlled to increase the refractive index of one glass by greater amounts than that of the other glass. Alternatively, since it has been found that the molecular structure of glasses can be undensified or dilated with an accompanying decrease in refractive index thereof under controlled time-temperature conditions, this invention also contemplates altering the refractive index of one of the constituent glasses of a fiber optical assembly to a greater degree than the other by undensifying or dilating its molecular structure.

Figure 2:
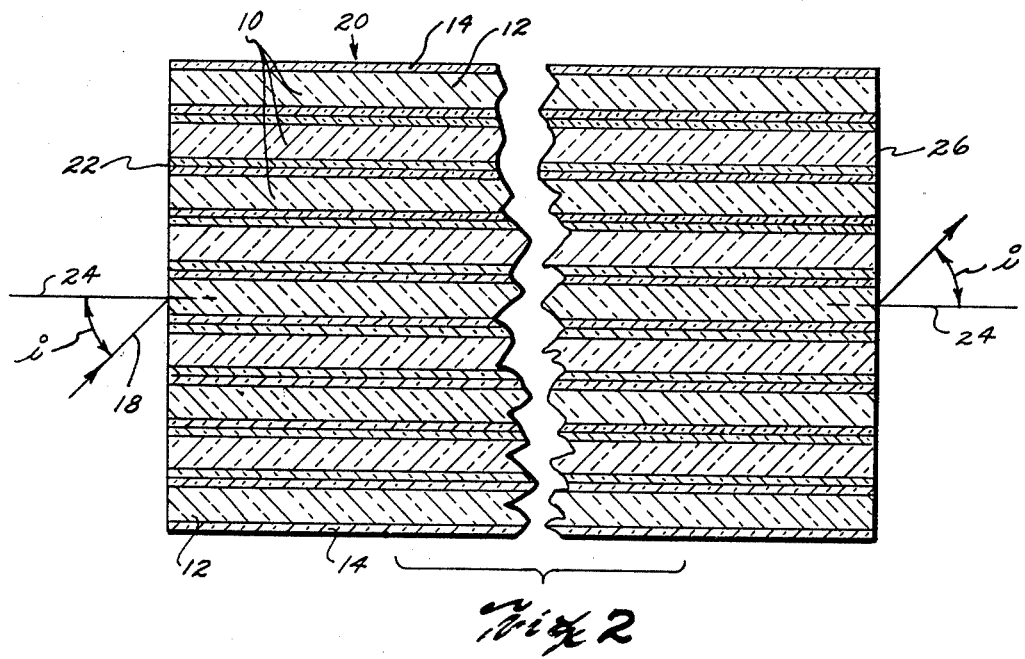

The present invention will be more fully understood by reference to the following detailed description which is accompanied by a drawing in which FIG. 1 illustrates, in greatly enlarged form, a longitudinal cross-section of an exemplary glass clad glass optical fiber; and FIG. 2 illustrates a longitudinal cross-section of a fiber optical light-conducting device formed of a plurality of such optical fibers fused together in side-by-side relationship.

In FIG. 1 there is illustrated optical fiber 10 comprising core 12 formed of glass having a relatively high index of refraction $N_g$ and cladding 14 tightly bonded by fusion to core 12. Cladding 14 is formed of glass having a refractive index $N_c$ which is lower than $N_g$. Interface 16 between core 12 and cladding 14 is highly internally reflective to light encountering said interface from core 12 at angles larger than critical angle of reflection $\phi$.

The extreme meridional ray 18 which, in entering fiber 10, will be conducted therethrough by total internal reflection is found from the relationship:

$$N_g \sin \phi = N_c \sin 90° = N_c$$

or $$\sin \phi = \frac{N_c}{N_g}$$

To find the angle $i$ outside fiber 10:

$$\sin i = N_g \sin \gamma = N_g \sin(90-\phi) = N_g \cos \phi =$$

$$N_g\sqrt{1-\sin^2\phi} = N_g\sqrt{1-\frac{N_c}{N_g^2}}$$

hence $\sin i = \sqrt{N_g^2 - N_c^2}$

Sine $i$ is conventionally defined as the "numerical aperture" or "N.A." of an optical fiber or system of fused-together fibers such as the bundle 20 thereof illustrated in FIG. 2. That is, a single fiber 10 or bundle 20 thereof as a unit will conduct from end-to-end substantially only light entering therein from within angle $i$ in any given meridional plane. Such light will leave the opposite end of fiber 10 or bundle 20 at substantially the same angle it entered when opposite ends of fibers 10 are cut square and highly polished.

While, in the case of extremely small optical fibers of diameters approaching the wavelengths of light to be transferred thereby, computations to predict numerical aperture require consideration of the affects of interference between components of light energy passing through the fibers, it is generally accepted that light transmitted by clad fibers of any size, or bundles thereof, is selected according to the degree of difference of refractive index between constituent core and cladding glasses of the fibers. Thus, for different applications requiring different numerical apertures, fibers having various preselected combinations of refractive index are used.

For example, in applications where large numerical aperture is needed, a refractive index difference between core and cladding glasses in the order of .23 may be used to give a numerical aperture of approximately .86 where the steepest ray accepted or emitted by the fiber or bundle thereof will be approximately 59.4° to the fiber axis. On the other hand, in applications where extremely small and precisely controlled numerical aperture is needed to cause a fiber optical device to receive and/or emit, for example, only light which is nearly collimated, numerical apertures as small as .005 and less having acceptance or emitting angles $i$ of only a few minutes of a degree may be required.

In no case, however, can extremely fine or precise control of numerical aperture be achieved with reliability through calculations or predictions based on the physical index measurements of constituent glasses taken prior to fabrication of a fiber optical structure. It has been well established in the art that during the fabrication of glass clad glass fibers and fused bundles thereof the heat softening and working of the glasses to various shapes and sizes produces appreciable changes in their refractive indices. Actually, in instances where extremely small numerical aperture is required in a fiber optical device, these changes occurring during fabrication are often greater in degree than the slight difference in refractive index required between core and cladding glasses to produce the desired numerical aperture.

Referring more particularly to FIG. 2, bundle 20 of fibers 10, all fused together, is shown to exemplify a fiber optical system or device of the general type in which fine adjustment of numerical aperture is accomplished according to principles of this invention. Bundle 20 may be of any desired length and cross-sectional size or shape and, while only a relatively few fibers 10 have been illustrated in greatly enlarged cross-sectional size, it should be understood that, in practice, bundle 20 might embody as many as several thousand fibers each having a cross-sectional size ranging from several thousandths of an inch in diameter to as little as only a few microns in diameter. Fibers 10 which have been illustrated as each having a single core 12 and cladding 14 might, alternatively, be of the multifiber type well known in the art. Multifibers comprise a plurality of core parts each surrounded by a cladding and all fused together as a unit.

A fiber optical system or device such as bundle 20 is constructed by first forming the fibers 10 thereof of core 12 and cladding 14 glasses carefully selected to have the refractive index difference which, according to conventional calculations and predictions, will produce, as near as possible, the numerical aperture required of the ultimate bundle 20. Fibers 10 are formed either by extrusion or the drawing-together of heat-softened component core and cladding glasses. Bundle 20 is then formed by assembling a required number of fibers 10 together in side-by-side relationship with each other and applying heat thereto of sufficient intensity to cause fusion of adjoining sides of the fibers. Bundle 20 may, for some applications, be rendered vacuum-tight by subjecting the same to ambient pressure of an amount sufficient to close and seal interstices between fibers 10 during fusion thereof. While the foregoing has set forth only in general terms some of the techniques used to form fiber optical devices such as bundle 20 shown in FIG. 2, it should be understood that various other practices well known in the art can be employed to equal advantage. The invention herein which relates to the treatment of fused fiber optical systems or bundles after final processing stages of the bundles have been completed should not require further detailed discussion of techniques relating to such processing stages.

According to principles of the present invention, however, fine adjustment in numerical aperture of a fused fiber optical assembly such as bundle 20 is used to compensate for mismatch in refractive index difference between constituent glasses of the assembly resulting from deviation of the refractive index properties of the glasses having taken place during processing of the assembly.

This is accomplished by first measuring the numerical aperture of the finally processed assembly to determine the extent of deviation thereof from a required value of numerical aperture.

One technique for measuring numerical aperture of a fiber optical assembly such as bundle 20 is to direct collimated light from means not shown in the drawing, along an established axis onto a light-receiving end face 22 thereof. With axis 24 of bundle 20 aligned parallel to said established axis, the collimated light will be conducted through bundle 20 and emitted at end face 26. Then, by progressively changing the angle of bundle 20 relative to said established axis in one selected meridian, a point is found where the light is no longer emitted at face 22. This is the "cut-off" point. Precise measurement of the angle between said established axis and axis 24 of bundle 20 establishes the acceptance angle. The sine of this angle gives the value of numerical aperture of bundle 20.

Another technique for measuring numerical aperture which is applicable to bundles of relatively small diameter fibers having numerical apertures of values less than .20, is to direct collimated monochromatic light into the receiving end of the bundle along a path parallel to the fiber axes and to observe under high magnification the exit fringes or patterns of interference rings produced at light-emitting ends of the fibers. These rings or dark bands, as it is well-known in the art, are produced by interference taking place between various portions of the light or optical energy being propagated through the fibers. The observed interference rings or dark bands are counted and numerical aperture, N.A., is determined from the relationship $$N.A. = \frac{n\lambda}{2d}$$

where $n$ equals the number of rings counted, $\lambda$ equals the wavelength of light used and $d$ equals the diameter size of the fibers.

If the numerical aperture of bundle 20 is greater than required, the difference in refractive index between core and cladding glasses of fibers 10 is greater than desired while a lesser value of numerical aperture indicates a smaller refractive index difference than desired.

In one aspect of the present invention it is contemplated that adjustment of numerical aperture be achieved by compacting or densifying the molecular structure of a selected one of the core or cladding glasses to increase its refractive index value without causing appreciable, or at least considerably less, densification or change in refractive index of the other glass.

It has been found that densification of glass and the accompanying increase in refractive index thereof is best accomplished when heated to a temperature sufficient to maintain the glass in an optimum viscosity range of from 14.5 to 18.5 log poises. In the upper limits of the optimum viscosity range where lower temperatures are used, densification of glass takes place less rapidly with time than in the lower limits where higher temperatures are applied to the glass. When heated to temperatures substantially above those required to maintain the glass within the above viscosity range, much less densification and index change takes place. However, when heated to temperatures substantially below those required to maintain the glass within the above-mentioned viscosity range, index change progresses decidedly slower and because of the extended index transformation period, the use of such temperature levels would not be practical. Thus, in view of the fact that the core and cladding glasses of optical fibers in general require heating to different temperatures to render them similarly viscous, it is possible to selectively differentially densify and alter the refractive indices of such glasses as follows:

In the situation first mentioned wherein the value of numerical aperture in bundle 20 must be reduced, selective densification of the fiber cladding glass 14 is brought about by heating the bundle to a temperature sufficient to bring the viscosity of the cladding glass appropriately within the range of from 14.5 to 18.5 log poises to increase the refractive index of the cladding glass to a greater degree than that of core glass 12. This brings the refractive index of said cladding glass into closer correspondence with that of the fiber core glass 12 and accordingly, reduces numerical aperture. In the second-mentioned situation where the value of numerical aperture in bundle 20 must be increased, selective densification of the fiber core glass 12 is brought about by heating the bundle to a temperature sufficient to bring the viscosity of the core glass appropriately within the range of from 14.5 to 18.5 log poises to increase its refractive index to a still higher value than that of the cladding glass. This produces greater refractive index difference between the core and cladding glasses and results in the achievement of greater numerical aperture.

In instances where a fused bundle of fibers does not transmit collimated light from end-to-end when tested to determine its numerical aperture, the refractive index of cladding glasses of the fibers is actually higher than the refractive index of the core glasses, a condition where transmittance of light by internal reflection is prevented. To remedy this condition according to one aspect of this invention, an increase of refractive index of the core glass is caused by compaction or densification thereof to a point where such index becomes higher than that of the respective cladding glass whereby the desired numerical aperture is achieved.

For purposes of illustration, the results of an actual reduction to practice are given as follows:

A long and thin bundle of 37 fused together glass clad glass fibers was formed. A light barium crown glass having an anneal point of approximately 916° Fahrenheit and a strain point of approximately 844° Fahrenheit was used to form the core parts of the fibers. A borosilicate crown glass having an anneal point of approximately 1032° Fahrenheit and a strain point of approximately 984° Fahrenheit was used as cladding material. Each fiber in the bundle was approximately 465 microns in diameter and the bundle was cut transversely to form a number of cylinders each approximately one inch in length. Opposite ends of each cylinder were cut square, ground and highly polished.

After final processing of the cylinders, their numerical aperture was measured and found to be approximately .0044 in each case giving an aperture half angle $i$ of approximately 15 minutes. Then, the cylinders were all placed in a furnace and, at the same time, all subjected to heat of a temperature of approximately 830° Fahrenheit produced and held substantially constant in the furnace for an extended period of time.

After 23.5 hours, a first of the cylinders was removed from the furnace, allowed to cool to room temperature and measured for numerical aperture. This was found to be .0037, giving an aperture half angle $i$ of approximately 12.5 minutes.

After 98.5 hours of exposure to the above-mentioned temperature, a second of the cylinders was removed from the furnace, allowed to cool to room temperature and measured for numerical aperture. This was found to be .0029, giving an aperture half angle $i$ of approximately 10 minutes; and After 351.5 hours a third cylinder upon being removed from the furnace and allowed to cool to room temperature exhibited a numerical aperture of .0022 giving an aperture half angle $i$ of approximately 7.5 minutes.

It will be observed that numerical aperture in the exemplary cylinders decreased in amounts determined by duration of exposure thereof to the heat of the preselected temperature of 830° Fahrenheit. This temperature being within the viscosity range of from 14.5 to 18.5 log poises of the borosilicate crown cladding glass at about 18.2 log poises produced densification and increase in index of refraction of the cladding glass at a rate greater with time than that of the core glass. In this way, the refractive index of the cladding glass was gradually increased and brought into closer correspondence with the refractive index of the core glass with the result of a gradual reduction in numerical aperture value.

In order to produce an increase in numerical aperture of the above-mentioned cylinders, heat of a temperature sufficient to bring the barium crown core glass to a viscosity within the range of from 14.5 to 18.5 poises would be used.

When it is desired to adjust numerical aperture in a fiber optical bundle by reducing the refractive index of one of the constituent glasses thereof to a greater extent than the other glass, an optimum temperautre is used which is sufficient to maintain the one glass in a viscosity range below that at which the glass was initially compacted either during fabrication of the bundle or during subsequent heat treating thereof. This would result in undensification or dilation of the molecular structure of the glass and produce an accompanying decrease in refractive index thereof.

From the foregong, it can be seen that under controlled time-temperature conditions, the numerical aperture of glass clad glass fibers and assemblies thereof can be increased or decreased as desired by small amounts determined according to a selected time of exposure of the assemblies to heat of a particular selected temperature. The amount of adjustment in numerical aperture is limited only by the extent to which the molecular structures of respective glasses can be compacted or uncompacted under the influence of such heat applied for time periods of reasonable duration.

I claim:

1. The method of making an adjustment in numerical aperture of an assembled fiber optical light-conducting device having a core part of a first glass characterized as having one refractive index and a known viscosity when heated to a given temperature greater than room temperature and a cladding of a second glass surrounding and fused to said core part characterized as having a different refractive index and different viscosity than said first glass when heated to said given temperature wherein the compactness of the molecular structures of said first and second glasses changes differentially with an accompanying corresponding change in refractive index thereof by amounts increasing as the duration of said heating is extended, the difference in refractive indices of said glasses being determinative of the numerical aperture of said device;

said method comprising the steps of:
heating said device to said given temperature;
holding the device at said temperature for a period of time sufficient to produce said adjustment in numerical aperture thereof;
discontinuing said heating; and
allowing said device to cool to room temperature.

2. The method according to claim 1 wherein said device is comprised of a multiplicity of core parts of said first glass each surrounded by a cladding of said second glass and all bundled together in compact side-by-side relationship with each other.

3. The method according to claim 1 wherein said given temperature to which said first and second glasses of said device are heated is preselected to establish said known viscosities thereof within a range wherein compactness of the molecular structure of the glasses will increase as the duration of said heating is extended.

4. The method according to claim 3 wherein said given temperature is preselected to be such that said cladding glass has a higher viscosity thereat than does said core glass whereby the compactness of molecular structure of said core glass will increase with extension of said period of heating at a rate greater than that of said cladding glas with a corresponding increase in the numerical aperture of said device.

5. The method according to claim 1 wherein said given temperature to which said first and second glasses of said device are heated is preselected to establish said known viscosities thereof within a range wherein compactness of the molecular structure of the glasses will decrease as the duration of said heating is extended.

6. The method according to claim 5 wherein said given temperature is preselected to be such that said core glass has a higher viscosity thereat than does said cladding glass whereby the compactness of said molecular structure of said cladding glass will decrease at a slower rate than that of said core glass as the duration of said heating is extended with a corresponding decrease in the numerical aperture of said device.

7. The method as recited in claim 1 wherein said given temperature is preselected to bring said first and second glasses to within a viscosity range of from 14.5 to 18.5 log poises when said device is heated thereto.

References Cited
UNITED STATES PATENTS

| | | | |
|---|---|---|---|
| 2,369,189 | 2/1945 | Tillyer et al. | 65—117 X |
| 2,418,489 | 4/1947 | Tillyer | 65—117 |
| 2,979,632 | 4/1961 | MacNeille | 65—4 X |
| 3,060,789 | 10/1962 | Hicks | 88—1 |
| 3,273,445 | 9/1966 | Siegmund | 88—1 |

DONALL H. SYLVESTER, *Primary Examiner.*

F. W. MIGA, *Assistant Examiner.*